May 20, 1924.
G. J. RACKHAM
1,494,503
CHANGE SPEED GEAR FOR AUTOMOBILE ENGINES
Filed Sept. 11, 1922
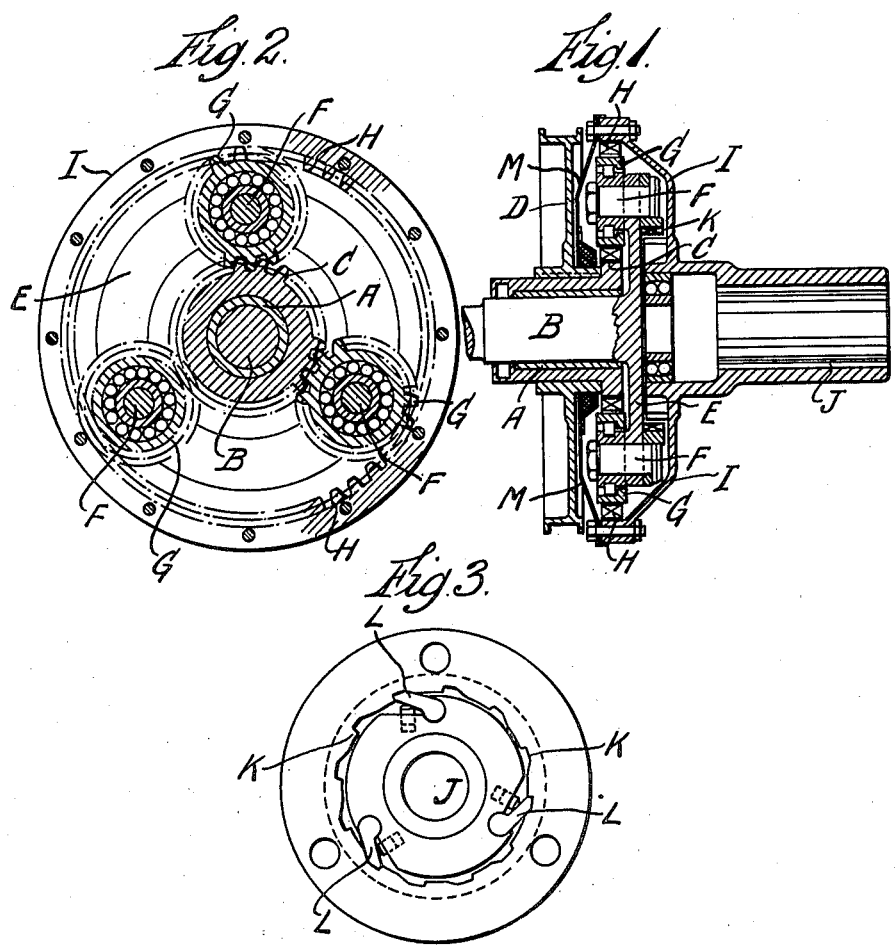
INVENTOR:
GEORGE JOHN RACKHAM,
By His Attorneys, Patented May 20, 1924.

1,494,503

UNITED STATES PATENT OFFICE.

GEORGE JOHN RACKHAM, OF LONDON, ENGLAND.

CHANGE-SPEED GEAR FOR AUTOMOBILE ENGINES.

Application filed September 11, 1922. Serial No. 587,391.

*To all whom it may concern:*

Be it known that I, GEORGE JOHN RACKHAM, a subject of the King of Great Britain, residing at Charlton House, Old Charlton, London, England, have invented new and useful Improvements in Change - Speed Gears for Automobile Engines, of which the following is a specification.

This invention relates to change speed gear for vehicles.

According to this invention I interpose between the gear box, which may be of any ordinary construction, and the front Cardan shaft an epicyclic gear and a free wheel arrangement.

The epicyclic gear consists of a sun wheel free to turn upon the Cardan shaft and having a brake drum fast with it, an internal ring of teeth fast with the front coupling of the gear box and one or more planet pinions carried by the shaft and meshing both with the sun and with the ring of teeth. If desired bevel wheels and pinions may be substituted for the toothed wheels and pinions.

The free wheel arrangement preferably consists of an internal ring of teeth carried by the shaft and pawls carried by the coupling, but this free wheel arrangement may be placed on other parts of the apparatus, for instance, between the sun and the part which carries the internal ring of teeth with which the planet pinions mesh.

My invention is illustrated by the accompanying drawing, Figure 1 of which is a section through the axis of the Cardan shaft and the gear box coupling, Figure 2 is a cross section through the teeth of the epicyclic gear, while Figure 3 shows the free wheel arrangement.

Free to rotate on a bush A carried by the rear end of the Cardan shaft B is a sun pinion C fast with a brake drum D. A flange E on the shaft B carries three studs F on which are mounted three planet pinions G meshing with the sun C and also with an internal ring of teeth H carried by a flange I on the front of the gear box coupling J. Normally the ring H, the flange E and the sun C all rotate at the same angular speed. Should, however, it be desired to increase the speed of the vehicle without increasing the speed of the engine, the movement of the sun is checked by tightening the brake on the drum D whereupon owing to the relative movement between the planet pinions and the sun the ring of teeth H is driven at a greater angular speed than the shaft B. The flange E carries an internal ring of teeth K with which can mesh pawls L on the coupling J. So long as the angular speed of the coupling J does not exceed that of the shaft B the pawls L do not move relatively to the teeth K but so soon as the speed of the coupling J exceeds that of the shaft B the pawls L ride over the teeth K. The flange I carries also a casing M which fits the boss of the brake drum D to retain lubrication for the gear.

What I claim is:—

1. In an automobile, a Cardan shaft, a sun free to rotate upon the Cardan shaft, a gear box coupling, a ring of teeth on the gear box coupling, a planet engaging both the sun and the ring of teeth, a brake drum fast with the sun, an internal ring of teeth mounted on the flange of the Cardan shaft, and pawls on the gear box coupling meshing with the ring of teeth.

2. In an automobile, a Cardan shaft, a sun free to rotate upon the Cardan shaft, a gear box coupling, a ring of teeth on the gear box coupling, a flange on the Cardan shaft, studs on the flange, planets on the studs engaging both the sun and the ring of teeth, a brake drum fast with the sun, an internal ring of teeth mounted on the Cardan shaft, and pawls on the gear box coupling adjacent said flange and meshing with the ring of teeth.

3. In an automobile, a Cardan shaft, a sun free to rotate thereon, a gear box coupling, a ring of teeth on the gear box coupling, a flange on the Carden shaft, planets carried by said flange and engaging both the sun and the ring of teeth, a brake drum fast with the sun, and a casing carried by the gear box coupling and engaging the hub of said brake drum to retain lubricant for the gearing set forth.

In testimony that I claim the foregoing as my invention I have signed my name this 28th day of August, 1922.

GEORGE JOHN RACKHAM.